United States Patent [19]
Vaughan

[11] 3,709,546
[45] Jan. 9, 1973

[54] CONDUIT PULLER

[76] Inventor: Donald R. Vaughan, P. O. Box 297, Woodland, Calif.

[22] Filed: July 20, 1970

[21] Appl. No.: 56,601

[52] U.S. Cl. ..........................................294/96, 279/2
[51] Int. Cl. ...........................B66c 1/54, B23b 31/40
[58] Field of Search ......279/2; 294/86.24, 86.25, 94, 294/96, 116

[56] References Cited

UNITED STATES PATENTS

| | | | |
|---|---|---|---|
| 2,624,610 | 1/1953 | Murphy | 294/96 |
| 2,939,739 | 6/1960 | Grunsky | 294/96 |
| 2,687,324 | 8/1954 | Grunsky et al. | 294/96 |
| 2,523,972 | 9/1950 | Sharratt et al. | 279/2 X |

*Primary Examiner*—Francis S. Husar
*Attorney*—Townsend and Townsend

[57] ABSTRACT

A device adapted to be inserted into one end of a conduit and for releasably engaging the inner surface of the conduit to allow the latter to be pulled by the device in one direction. The device has a cam member, a number of toothed elements slidable along the cam member and frictionally engageable with the inner surface of the conduit, and means for forcing the elements along the member to move the elements radially outwardly thereof effectively increase the diameter of the elements.

2 Claims, 10 Drawing Figures

PATENTED JAN 9 1973

INVENTOR.
DONALD R. VAUGHAN
BY
Townsend and Townsend
ATTORNEYS

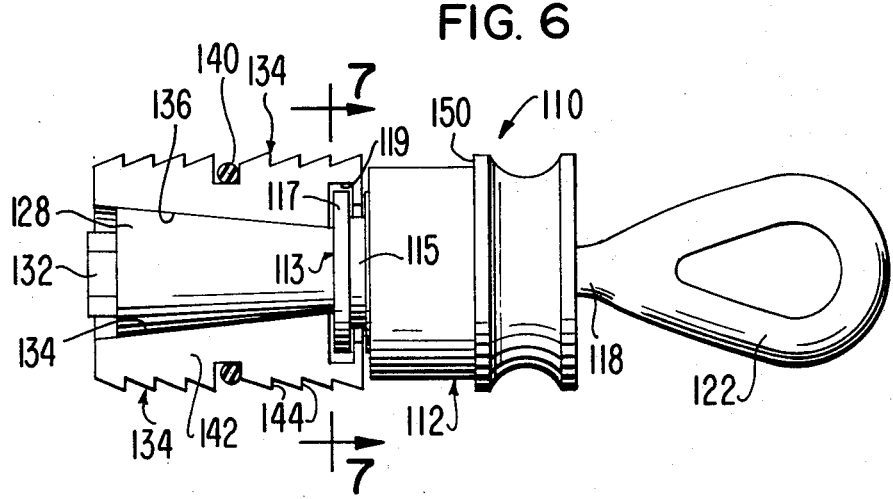
FIG. 6
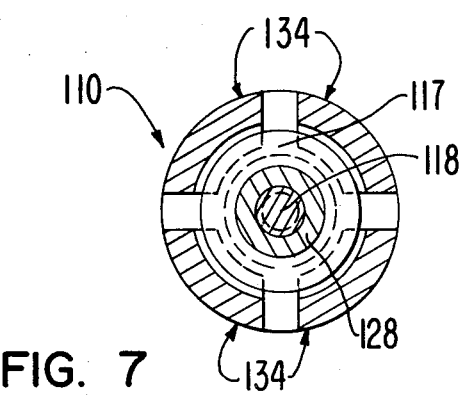
FIG. 7
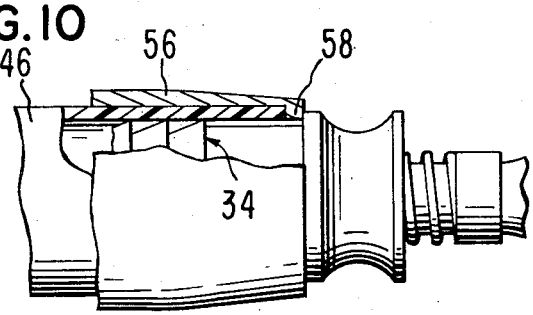
FIG. 8
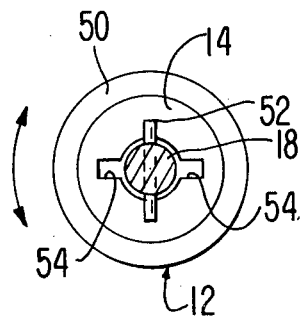
FIG. 9
FIG. 10

CONDUIT PULLER

This invention relates to improvements in devices for pulling conduits through restricted passages and, more particularly, to a conduit puller engageable with the inner surface of a conduit to be pulled.

In moving conduits through restricted passages in buildings, in underground areas or at other locations, it is extremely desirable to be able to attach a line to the conduit and then to pull the conduit through the passage. Conduit pullers have been devised in the past for accomplishing this purpose, but, for the most part, they are complex in construction and costly to produce. Also, they are made to grip the outer surface of a conduit and this effectively increases the diameter requirement for the passage through which the conduit is to be moved. In view of the foregoing problems, conventional conduit pullers are unsatisfactory and a need has arisen for a more efficient puller, particularly one that can engage the inner surface of a conduit without causing any damage to the conduit itself.

The present invention provides a conduit puller of improved construction which overcomes the problems mentioned above and which is easy to use and provides a positive connection to a conduit to assure complete movement of the latter through a passage of limited cross section. To this end, the puller of this invention includes a number of articulated elements which move radially outwardly from a camming member and into engagement with the inner surface of a conduit as the elements move longitudinally of the camming member. The means for shifting the elements includes a tubular body shiftably mounted on a shaft to which the camming member is connected. The tubular body is biased in a direction to cause the elements to be normally urged toward their conduit-engaging positions. Thus, by shifting the body in a direction against the bias force exerted thereon, the elements can be moved radially inwardly to permit the puller to be inserted into the end of a conduit. Release of the body then causes the elements to move radially outwardly once again, and if the puller is within a conduit, into frictional engagement with the inner surface of the conduit.

Each element has spaced teeth thereon with each tooth having a sharp edge for engaging the conduit. The orientation of the teeth is such that the elements can move along the camming member in a direction to reduce the effective diameter of the teeth as the puller is inserted into one end of a conduit; however, the teeth prevent the movement of the puller out of the conduit when a pulling force is exerted on the puller itself. Thus, there is a one-way clutch action provided by the puller to assure a positive connection with the conduit at all times to avoid the separation of the puller from the conduit as the latter is being pulled through a restricted passage.

The primary object of this invention is to provide an improved conduit puller having a number of conduit engaging elements which are shifted radially inwardly and outwardly with respect to a central mount for the elements, whereby the elements can frictionally engage the inner surface of a conduit to thereby grip the same so that it can be pulled in one direction through a restricted passage.

Another object of this invention is to provide a puller of the type described wherein the elements surround a camming member and move longitudinally of the latter and are shifted radially thereby as a function of the location of the movement of the elements along the same to thereby provide for movement of the elements into and out of frictional engagement with the inner surface of a conduit.

Another object of this invention is to provide a conduit puller of the aforesaid character which has a maximum transverse demension substantially equal to or less than the outer transverse demension of a conduit to be pulled to facilitate the movement of the conduit through a restricted passage as it is being pulled by said puller.

Other objects of this invention will become apparent as the following specification progresses, reference being had to the accompanying drawing for several embodiments of the invention.

In the drawings:

FIG. 6 is a view similar to FIG. 2 but illustrating a second embodiment of the puller, parts being in section to illustrate details of construction;

FIG. 7 is a cross-sectional view taken along line 7—7 of FIG. 6;

FIG. 8 is a fragmentary, cross-sectional view of a portion of the puller of FIGS. 1–5, showing a releasable holding means therefor;

FIG. 9 is a cross-sectional view taken along line 9—9 of FIG. 8.

FIG. 10 is a fragmentary, side elevational view, partly in section, of the conduit puller in combination with a rigid tube for supporting a conduit in which the puller is disposed.

Figure 3:
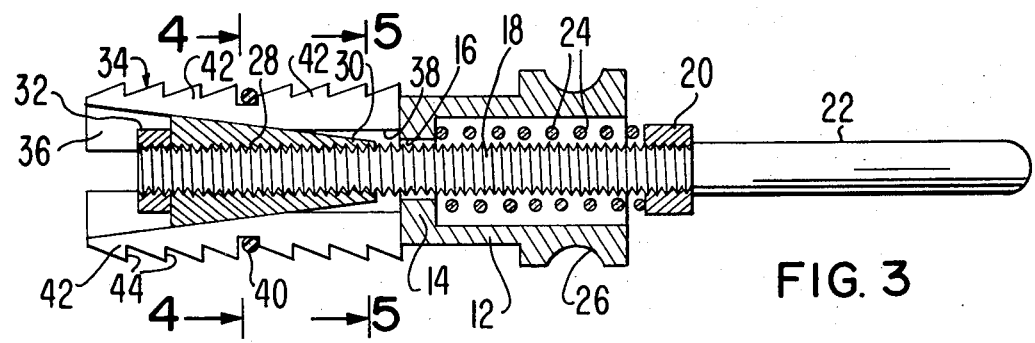
FIG. 3 is a longitudinal section through the puller.

The first embodiment of the conduit puller of this invention is broadly denoted by the numeral 10 and includes a tubular body 12 having a wall 14 at one end thereof and being open at the opposite end. Wall 14 has an opening 16 therethrough whereby a threaded shaft 18 can extend into and through the body. A nut 20 is threaded on shaft 18 near a closed loop 22 on one end of shaft 18. A coil spring 24 normally under compression surrounds shaft 18 and extends between end wall 14 and nut 20 (FIG. 3). Body 12 has an annular groove 26 therein near the open end thereof to facilitate manual movement of the body against the bias force of spring 24.

A conical member 28 is threadably mounted on shaft 18 adjacent to the end thereof remote from closed loop 22. Member 28 has a conical, outer surface 30 whose apex end is near opening 16 in end wall 14. Member 28 is adjustably positioned along the length of shaft 18 and a nut 32 is threaded onto the proximal end of shaft 18 to limit the movement of member 28 along the length of the shaft.

Figure 4:
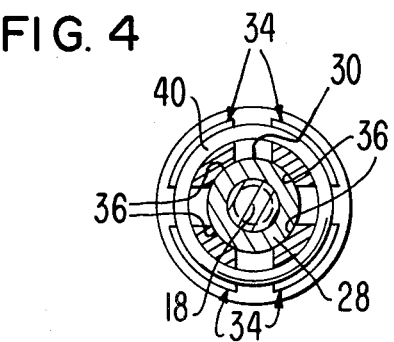
FIG. 4 is a cross-sectional view taken along line 4—4 of FIG. 3.
Figure 5:
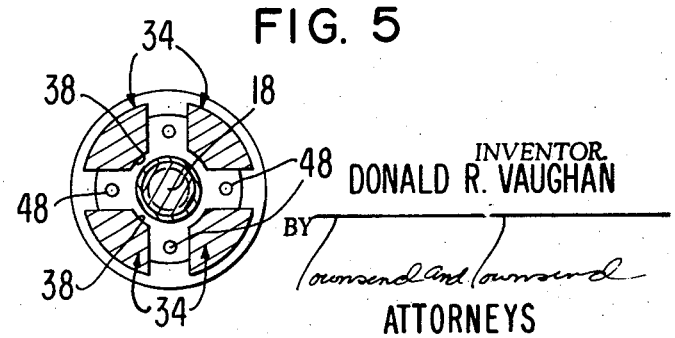
FIG. 5 is a cross-sectional view taken along line 5—5 of FIG. 3.

A number of toothed, conduit-engaging elements 34 are disposed about member 28 and are in sliding engagement therewith. For purposes of illustration, there are four elements 34 (FIGS. 4 and 5) each element 34 having an arcuate inner surface 36 which is in complemental engagement with and slidable on the conical outer surface of member 28. Surface 36 of each element 34 extends to more than half the length of the element, the remainder of the inner surface of the element defining a cylindrical surface 38 which extends to the end of the element adjacent to body 12. The elements are held on member 28 by a resilient band 40, such as an O-ring or the like. Band 40 allows radial movement of elements 34 relative to member 28 as body 12 shifts longitudinally of shaft 18.

Figure 1:
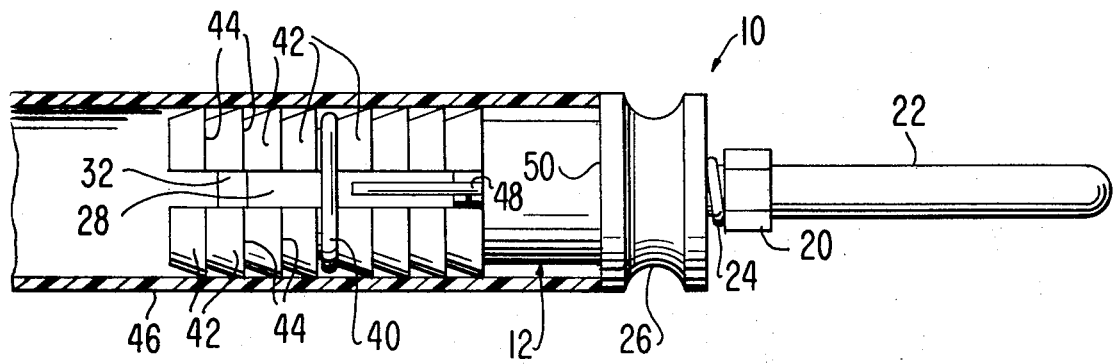
FIG. 1 is a side elevational view of one embodiment of the conduit puller of this invention, showing the puller within a conduit and frictionally engaging the inner surface thereof.
Figure 2:
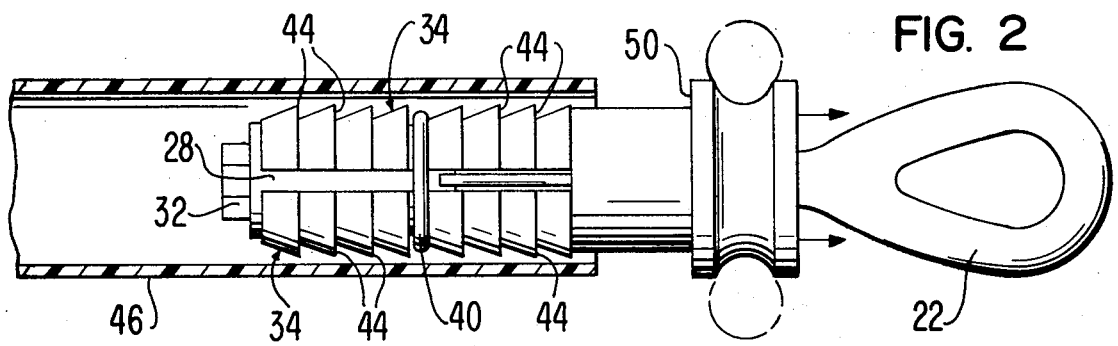
FIG. 2 is a view similar to FIG. 1 but showing the puller out of frictional engagement with the conduit.

Each element 34 has a number of arcuate teeth 42 which have sharp outer edges 44 for engaging the inner surface of a conduit 46 surrounding elements 34 (FIG. 1). These teeth are forced against the conduit inner surface by the camming action of member 28 as body 12 forces elements 34 toward the left-hand end of shaft 18 when viewing FIG. 3. Spring 24 biases body 12 to the left and the body is in engagement with the proximal ends of elements 34. Each tooth is configured in the manner shown in FIG. 3 so as to provide a one-way clutch action to assure positive attachment of puller 10 to the conduit. This action is achieved since a pull to the right on shaft 18 tends to urge elements 34 further outwardly of member 28.

Guide means is provided to keep the elements spaced from each other so that they do not frictionally engage each other. To this end, a number of pins 48 are secured to and project outwardly from end wall 14, there being a pin between each pair of adjacent elements 34, respectively.

In use, puller 10 will generally be adapted to be inserted in one end of a conduit of a particular inside diameter. Body 12 has an annular shoulder 50 for engaging the end face of the conduit as shown in FIG. 1 when the puller is inserted thereinto. Initially, the position of member 28 along shaft 18 will be set. Also, spring 24 will be under compression and the compression force can be adjusted by manipulating nut 20.

Before the puller is inserted into the conduit, body 12 is manually pulled toward the closed loop 22 by grasping the body with the fingers or a suitable tool within groove 26. This will further compress spring 24 and move end wall 14 to the right when viewing FIG. 3. This action permits elements 34 to move to the right along the conical outer surface of member 28, thereby decreasing the effective diameter of teeth 42. This allows puller 10 to be inserted into one end of conduit 46 without having the teeth in frictional engagement with the inner surface of the conduit.

Puller 10 is inserted into the conduit until the end face of the conduit engages shoulder 50 of body 12 as shown in FIG. 1. Thereupon, body 12 and looped end 22 are released, causing spring 24 to force shaft 18 to the right when viewing FIG. 3. This movement of the shaft will cause member 28 to move to the right with respect to elements 34 since the latter abut end wall 14 of body 12 and do not move within the conduit. Movement of member 28 to the right forces elements 34 radially outwardly so that edges 44 of teeth 42 "bite" into or frictionally engage the inner surface of conduit 46, thereby releasably connecting puller 10 to conduit 46. Resilient band 40 allows outward movement of elements 34 with respect to shaft 18 since the restoring force of spring 24 is greater than that of band 40.

A cable or line can be connected through loop 22 and pulled to the right, whereupon the conduit will be pulled in the same direction through a desired distance.

When it is desired to separate puller 10 from the conduit, shaft 18 is manually forced inwardly of the conduit against the bias force of spring 24. This causes member 28 to move to the left when viewing FIG. 3, thereby allowing elements 34 to move radially inwardly with respect to shaft 18 and thereby move out of frictional engagement with the inner surface of the conduit. While spring 24 is then compressed, puller 10 can be pulled out of the conduit to the right when viewing FIG. 3. After it is completely out of the conduit, body 12 is released, allowing spring 24 to move body 12 to the left with respect to the shaft.

If it is desired to releasably lock body 12 to shaft 18 after spring 24 has been further compressed, i.e., to allow insertion of the puller into a conduit, a pin 52 (FIGS. 8 and 9) can be provided on shaft 18 so that the pin extends outwardly in opposed directions. End wall 14 is provided with a pair of diametrically opposed slots 54 which permit the pin to pass through the end wall. Thus, when the spring is compressed, pin 52, which is normally within body 12, is allowed to pass through slots 54 as body 12 moves to the right relative to shaft 18 when viewing FIG. 8. Thereupon, body 12 can be rotated through an angle, such as 90°, to rotate pin 52 out of alignment with slots 54. The pin will then engage end wall 14 and prevent body 12 from returning to the left when viewing FIG. 8. In this way, spring 24 does not have to be continually compressed as the puller is inserted into the conduit. It can be inserted into the conduit, then body 12 is rotated so that pin 52 moves back into alignment with slots 54. Body 12 is then released and pin 52 moves through the slots to thereby shift body 12 to the left to, in turn, move elements 34 along the conical outer surface of member 28 and radially outwardly into frictional engagement with the inner surface of the conduit surrounding the same.

A second embodiment of the conduit puller of this invention is shown in FIGS. 6 and 7 and is of a construction similar to conduit puller 10 except in the way in which the conduit-engaging elements are coupled to the shiftable body. In the first embodiment, there is no direct connection between elements 34 and body 12. The elements merely abut the end wall of the body and are moved longitudinally of the camming member 28 when body 12 moves in the same direction under the influence of spring 24.

In the second embodiment, there is a direct connection between the conduit-engaging elements and the shiftable body. This connection allows the elements to move out of engagement with the inner surface of the conduit when the body is shifted in the opposite direction against the bias force of the spring tending to hold the elements in frictional engagement with the conduit. To this end, the second embodiment includes a conduit puller 110 having a body 112 of substantially the same construction as body 12 of the first embodiment. A shaft 118 extends through body 112 and has a conical camming member 128 threaded thereon. A nut 132 limits the travel of member 128 along the shaft. A number of conduit-engaging elements 134 are disposed about and are slidable along the outer surface of member 128. A resilient band or O-ring 140 holds elements 134 on member 128 and allow the elements to move radially outwardly of shaft 118 as body 112 moves to the left when viewing FIG. 6. Each element 134 has a number of arcuate teeth 142 with each tooth having a sharp, outer edge 144 for engaging the inner surface of a conduit to be pulled.

Body 112 has an extension 113 which surrounds shaft 118 and is provided with an annular groove 115. The groove defines an annular flange 117 which is received within an arcuate groove 119 formed in the inner surface of each element 134, respectively. In this way, elements 134 are connected to body 112 for movement therewith axially of shaft 118. Band 140 holds grooves 119 about flange 117 as elements 134 move longitudinally of member 128.

In use, body 112 is moved to the right when viewing FIG. 6 to thereby move elements 134 to the right and along member 128. The conical inner surfaces 136 of elements 134 permit the elements to move radially inwardly with respect to shaft 118 as the elements move to the right. This action effectively decreases the outer diameter of teeth 142 to thereby permit insertion of the puller into the end of a conduit until shoulder 150 on body 112 abuts the end face of the conduit. When this occurs, body 112 is released, allowing shaft 118 to move to the left relative to body 112. Member 128 thus forces elements 134 radially outwardly and into frictional engagement with the inner surface of the conduit. A cable can then be connected to closed loop 122 to pull the assembly to the right.

At the end of the conduit travel, shaft 118 is moved to the left relative to body 112, permitting elements 134 to move radially inwardly and out of frictional engagement with the conduit. The puller can then be moved to the right out of the conduit and body 112 can then be released with respect to shaft 118. The depth of grooves 119 allows radial movement of flange 117 therein as elements 134 move radially inwardly and outwardly with respect to member 128.

If conduit 46 is formed of plastic, it may be deemed desirable or necessary to support the end of the conduit externally thereof when conduit puller 10 is connected thereto. The reason for this is that some plastic materials may fracture due to the forces exerted on the inner surface thereof by elements 34. To avoid this problem, a rigid tube 56 of a suitable material, such as metal or the like is adapted to be placed on the end of the conduit in the manner shown in FIG. 10 to provide a backing support for the conduit when elements 34 frictionally engage the inner surface of the conduit. Tube 56 complementally receives conduit 46 and has an annular, inwardly extending flange 58 which provides a stop for the end of the conduit. Any tendency for the conduit to expand due to forces exerted thereon by elements 34 is countered by tube 56. Thus, the conduit remains intact and cannot fracture or otherwise be damaged by such forces.

What is claimed is:

1. A conduit puller comprising: a shaft; a member mounted on the shaft and having a cam surface extending away from the shaft at a predetermined angle; a pair of conduit-engaging elements; means coupled with the elements for yieldably holding the same in sliding engagement with said cam surface, the latter having a configuration permitting the elements to shift radially with respect to the shaft as the elements move longitudinally thereof; a tubular body surrounding the shaft and movable along the same; a coil spring surrounding the shaft within the body, said spring normally being under compression and in engagement with one end of the body to force the latter against the ends of said elements to thereby cause the latter to be biased in a direction to cause the elements to shift radially outwardly with respect to the shaft; and means on the body for connecting the end of each element thereto, whereby the elements and the body move together along the shaft.

2. A puller as set forth in claim 1, wherein said connecting means includes an annular flange, each element having a groove therein adjacent to said body, the flange extending into the grooves of the elements and being radially shiftable relative thereto.

* * * * *